United States Patent
Ishihara et al.

(10) Patent No.: US 8,841,032 B2
(45) Date of Patent: Sep. 23, 2014

(54) MICROPOROUS MEMBRANES, METHODS FOR MAKING SUCH MEMBRANES, AND THE USE OF SUCH MEMBRANES AS BATTERY SEPARATOR FILM

(75) Inventors: Takeshi Ishihara, Nasushiobara (JP); Satoshi Miyaoka, Nasushiobara (JP)

(73) Assignee: Toray Battery Separator Film Co., Ltd. (JP)

( * ) Notice: Subject to any disclaimer, the term of this patent is extended or adjusted under 35 U.S.C. 154(b) by 387 days.

(21) Appl. No.: 13/322,925

(22) PCT Filed: Jun. 8, 2010

(86) PCT No.: PCT/US2010/037764
§ 371 (c)(1),
(2), (4) Date: Nov. 29, 2011

(87) PCT Pub. No.: WO2010/147801
PCT Pub. Date: Dec. 23, 2010

(65) Prior Publication Data
US 2012/0082899 A1    Apr. 5, 2012

Related U.S. Application Data

(60) Provisional application No. 61/218,720, filed on Jun. 19, 2009, provisional application No. 61/298,752, filed on Jan. 27, 2010, provisional application No. 61/298,756, filed on Jan. 27, 2010, provisional application No. 61/346,675, filed on May 20, 2010, provisional application No. 61/351,380, filed on Jun. 4, 2010.

(51) Int. Cl.
| | |
|---|---|
| *H01M 2/16* | (2006.01) |
| *B32B 9/04* | (2006.01) |
| *H01M 2/14* | (2006.01) |
| *B32B 27/32* | (2006.01) |
| *H01M 10/0525* | (2010.01) |

(52) U.S. Cl.
CPC .............. *H01M 2/16* (2013.01); *H01M 2/145* (2013.01); *B32B 27/32* (2013.01); *Y02T 10/7011* (2013.01); *H01M 10/0525* (2013.01); *Y02E 60/12* (2013.01); *H01M 2/1686* (2013.01)
USPC ............................ 429/253; 429/129; 429/254

(58) Field of Classification Search
USPC ......... 429/254, 145, 253, 129; 264/51, 210.1, 264/176.1; 428/315.7, 316.6, 315.5
See application file for complete search history.

(56) References Cited

U.S. PATENT DOCUMENTS

| | | |
|---|---|---|
| 4,873,037 A | 10/1989 | Chau et al. |
| 5,084,534 A | 1/1992 | Welborn, Jr. et al. |
| 5,453,333 A | 9/1995 | Takauchi et al. |
| 5,534,593 A | 7/1996 | Friedman |
| 5,616,246 A | 4/1997 | Gagnon et al. |
| 6,100,334 A | 8/2000 | Abdou-Sabet |
| 8,338,020 B2 | 12/2012 | Ishihara et al. |
| 2002/0168564 A1 | 11/2002 | Wensley |
| 2006/0204854 A1 | 9/2006 | Fujimoto et al. |
| 2007/0120526 A1 | 5/2007 | Kumeuchi et al. |
| 2007/0128512 A1 | 6/2007 | Kaimai et al. |
| 2007/0160902 A1 | 7/2007 | Ando et al. |
| 2008/0057388 A1 | 3/2008 | Kono et al. |
| 2008/0057389 A1 | 3/2008 | Kono et al. |
| 2009/0011745 A1 | 1/2009 | Cha |
| 2009/0134538 A1 | 5/2009 | Takita et al. |
| 2009/0148761 A1 | 6/2009 | Kikuchi et al. |
| 2009/0169862 A1 | 7/2009 | Rhee et al. |
| 2009/0186279 A1 | 7/2009 | Brant et al. |
| 2009/0269672 A1* | 10/2009 | Takita et al. .................. 429/254 |
| 2010/0003588 A1 | 1/2010 | Sudou et al. |

FOREIGN PATENT DOCUMENTS

| | | | |
|---|---|---|---|
| JP | 59-196706 | 11/1984 | |
| JP | 61-227804 | 10/1986 | |
| JP | 2004-018660 | 1/2004 | |
| JP | 2005-171230 | 6/2005 | |
| JP | 2008/080536 | 4/2008 | |
| WO | WO-2007/037289 A1 * | 4/2007 | .............. B32B 27/32 |
| WO | 2007/052663 | 5/2007 | |
| WO | 2007/132942 | 11/2007 | |
| WO | 2008/016174 | 2/2008 | |
| WO | 2008/016174 A1 | 2/2008 | |
| WO | 2008/018584 | 2/2008 | |
| WO | 2008/140835 | 11/2008 | |

OTHER PUBLICATIONS

Machine Translation of: JP 2004/018660 A, Maki et al., Jan. 22, 2004.*
Sun, T. et al., "Effect of Short Chain Branching on the Coil Dimensions of Polyolefins in Dilute Solution," *Macromolecules*, 2001, vol. 3, No. 19, pp. 6812-6820 (1 page Abstract).
US Official Action dated Dec. 9, 2013 for U.S. Appl. No. 13/322,932.
Patrick Brant et al. "Effect of Tacticity on the Dilute Solution Coil Dimensions of Poly (α-olefins)s", Mar. 8, 2005, vol. 38, pp. 7181-7183, *Macromolecules. American Chemical Society*.

* cited by examiner

*Primary Examiner* — Kenneth Douyette
(74) *Attorney, Agent, or Firm* — DLA Piper LLP (US)

(57) ABSTRACT

The invention relates to microporous membranes having high meltdown temperature, low shutdown temperature, and resistance to heat shrinkage at elevated temperature. The membranes can be produced by stretching a sheet comprising polymethylpentene, polyethylene, and diluent, and then removing the diluent. The membranes can be used as battery separator film in, e.g., lithium ion batteries.

10 Claims, No Drawings

US 8,841,032 B2

MICROPOROUS MEMBRANES, METHODS FOR MAKING SUCH MEMBRANES, AND THE USE OF SUCH MEMBRANES AS BATTERY SEPARATOR FILM

CROSS-REFERENCE TO RELATED APPLICATIONS

The present application claims priority from U.S. Ser. No. 61/351,380, filed Jun. 4, 2010, and claims the benefit of and priority from U.S. Ser. No. 61/298,752, filed Jan. 27, 2010; U.S. Ser. No. 61/298,756, filed Jan. 27, 2010; U.S. Ser. No. 61/218,720, filed Jun. 19, 2009; and U.S. Ser. No. 61/346,675, filed May 20, 2010, and, all of which are incorporated by reference in their entirety.

FIELD OF THE INVENTION

The invention relates to microporous membranes having high meltdown temperature, low shutdown temperature, and resistance to heat shrinkage at elevated temperature. The membranes can be produced by stretching a sheet comprising polymethylpentene, polyethylene, and diluent, and then removing the diluent. The membranes can be used as battery separator film in, e.g., lithium ion batteries.

BACKGROUND OF THE INVENTION

Microporous membranes are useful as battery separator film ("BSF") for primary and secondary batteries. Such batteries include lithium ion secondary batteries, lithium-polymer secondary batteries, nickel-hydrogen batteries, nickel-cadmium batteries, nickel-zinc batteries, silver-zinc batteries, etc. Improving BSF properties can lessen the risk of battery failure, particularly in lithium ion batteries.

One battery failure mode involves the softening and loss of mechanical integrity that is observed when the BSF is exposed to a temperature above the BSF's meltdown temperature. This situation might occur, e.g., when an internal short circuit converts a portion of the battery's electrical energy into heat or when the battery is exposed to an external heat source. The reduced strength of the softened BSF increases the risk of anode-cathode contact, which might lead to uncontrolled battery failure. To lessen this risk, microporous membranes have been produced with increased meltdown temperature. Japanese Patent Applications No. JP59-196706A and JP61-227804A, for example, disclose the use of polymethylpentene (PMP) to increase membrane meltdown temperature for improved battery safety.

Another battery failure mode results from increased battery temperature as electrolytic activity continues in the battery during overcharge or rapid-discharge conditions. To lessen this risk, microporous polymeric membranes have been produced as BSFs with a failsafe property called shutdown. When the membrane is exposed to a temperature above its shutdown temperature, increased polymer mobility reduces membrane permeability. This leads to reduced battery electrolyte transport, thereby diminishing the amount of heat generated in the battery. BSFs having a lower shutdown temperature are desired for improved battery safety.

Yet another battery failure mode involves the shrinkage of the BSF at elevated temperature (heat shrink), e.g., at a temperature between the BSFs shutdown and meltdown temperatures. Should heat shrinkage lead to a reduced BSF width, the close spacing between anode, cathode, and separator can lead to an internal short circuit in the battery, even at temperatures below the BSFs meltdown temperature. This is particularly the case in prismatic and cylindrical batteries, where even a small change in membrane width can result in anode-cathode contact at or near the battery's edges. To take better advantage of increased battery safety margin provided by increased BSF meltdown temperature, it is desired to lessen the amount of BSF heat shrinkage, particularly at temperatures significantly above the BSF's shutdown temperature. In particular, it is desirable to increase the BSF's meltdown temperature, decrease its shutdown temperature, and decrease its heat shrinkage, without significantly degrading other important BSF properties, such as permeability or strength.

The prior art discloses at least two ways for lowering BSF shutdown temperature. The first, disclosed in U.S. Patent Application Publication No. 2009/011745, involves utilizing ultra high molecular weight polyethylene and a second polyethylene having a relatively high terminal unsaturation content.

The second method for decreasing shutdown temperature, which is disclosed in Japanese Patent Publication No. JP2008-080536, utilizes a low melting point polymer to achieve a low membrane shutdown temperature. To avoid degrading permeability, membrane stretching occurs at a relatively low temperature of 95° C. (with no heat setting step) to avoid melting the low melting point polymer. Although there is a significant shutdown temperature improvement, the low stretching temperature and lack of a heat setting step leads to increased BSF heat shrinkage.

While improvements have been made, membranes are desired that have high meltdown temperature, low shutdown temperature, and resistance to heat shrinkage at elevated temperature.

SUMMARY OF THE INVENTION

In an embodiment, the invention relates to a membrane comprising a polymer mixture, the polymer mixture comprising: (a) polymethylpentene having a Tm ≥200.0° C., and an MFR ≤80.0 dg/min; (b) a first polyethylene having an Mw <1.0×10$^6$, an MWD ≤15.0, an amount of terminal unsaturation ≤0.20 per 1.0×10$^4$ carbon atoms and a Tm ≥131.0° C.; and (c) a second polyethylene having a Tm <131.0° C., wherein the membrane (i) is microporous; (ii) has a meltdown temperature ≥180.0° C.; (iii) has a shutdown temperature ≤131.0° C.; and (iv) has a 170° C. TD heat shrinkage ≤30.0%.

In another embodiment, the invention relates to a method for producing a microporous membrane comprising: (1) extruding a mixture of diluent and polymer, the polymer comprising an amount $A_1$ of polymethylpentene, an amount $A_2$ of a first polyethylene, and an amount $A_3$ of a second polyethylene, wherein $A_1$ is in the range of 5.0 wt % to 25.0 wt %, $A_2$ is in the range of 30.0 wt % to 50.0 wt %, and $A_3$ is in the range of 5.0 wt % to 20.0 wt % with the weight percents being based on the weight of the polymer in the polymer-diluent mixture; (2) stretching the extrudate in at least one planar direction; and (3) removing at least a portion of the diluent from the stretched extrudate; wherein (a) the polymethylpentene has a Tm ≥200.0° C., and an MFR ≤80.0 dg/min; (b) the first polyethylene has an Mw <1.0×10$^6$, an MWD ≤15.0, an amount of terminal unsaturation 0.20 per 1.0×10$^4$ carbon atoms and a Tm ≥131.0° C.; and (c) the second polyethylene has a Tm <131.0° C.

In yet another embodiment, the invention relates to a battery comprising an anode, a cathode, and electrolyte, and a battery separator located between the anode and the cathode, the battery separator comprising (a) polymethylpentene having a Tm ≥200.0° C., and an MFR ≤80.0 dg/min; (b) a first polyethylene having an Mw <1.0×10⁶, an MWD ≤15.0, an amount of terminal unsaturation ≤0.20 per 1.0×10⁴ carbon atoms and a Tm ≥131.0° C.;

and (c) a second polyethylene having a Tm <131.0° C., wherein the battery separator (i) is microporous; (ii) has a meltdown temperature ≥180.0° C.; (iii) has a shutdown temperature ≤131.0° C.; and (iv) has a 170° C. TD heat shrinkage ≤30.0%.

DETAILED DESCRIPTION

The invention is based in part on the discovery of microporous membranes comprising a polymer mixture and having high meltdown temperature, low shutdown temperature, and resistance to heat shrinkage at elevated temperature. The membranes have sufficient strength and permeability to be useful as BSFs in, e.g., lithium ion batteries. By selecting the types and relative amounts of the polymethylpentene and polyethylene in the polymer mixture, as set forth in detail below, it has been found that heat setting at a temperature ≥110.0° C. can be accomplished to produce a membrane having relatively high permeability, high strength, and low heat shrinkage at elevated temperature. The membranes comprise microfibrils having a substantially uniform polymer phase, with little or no phase separation of the polymer species used to produce the membrane. It is believed that the desirable properties exhibited by the membranes of the invention result from the presence of such microfibrils.

For the purpose of this description and the appended claims, the term "polymer" means a composition including a plurality of macromolecules, the macromolecules containing recurring units derived from one or more monomers. The macromolecules can have different size, molecular architecture, atomic content, etc. The term "polymer" includes macromolecules such as copolymer, terpolymer, etc. "Polyethylene" means polyolefin containing ≥50.0% (by number) recurring ethylene-derived units, preferably polyethylene homopolymer and/or polyethylene copolymer wherein at least 85% (by number) of the recurring units are ethylene units. "Polypropylene" means polyolefin containing >50.0% (by number) recurring propylene-derived units, preferably polypropylene homopolymer and/or polypropylene copolymer wherein at least 85% (by number) of the recurring units are propylene units. "Polymethylpentene" means polyolefin containing ≥50.0% (by number) recurring methylpentene-derived units, preferably polymethylpentene homopolymer and/or polymethylpentene copolymer wherein at least 85% (by number) of the recurring units are methylpentene units. A "microporous membrane" is a thin film having pores, where ≥90.0% (by volume) of the film's pore volume resides in pores having average diameters in the range of from 0.01 μm to 10.0 μm. With respect to membranes produced from extrudates, the machine direction ("MD") is defined as the direction in which an extrudate is produced from a die. The transverse direction ("TD") is defined as the direction perpendicular to both MD and the thickness direction of the extrudate. MD and TD can be referred to as planar directions of the membrane, where the term "planar" in this context means a direction lying substantially in the plane of the membrane when the membrane is flat.

Microporous Membrane Composition

In an embodiment, the invention relates to a microporous membrane comprising a polymer mixture, the polymer mixture comprising polymethylpentene (e.g., ≥10.0 wt % based on the weight of the membrane) having a Tm ≥200.0° C., and an MFR ≤80.0 dg/min; a first polyethylene (e.g., ≥30.0 wt % based on the weight of the membrane) having a weight average molecular weight ("Mw") <1.0×10⁶, a molecular weight distribution ("MWD", defined as Mw divided by the number average molecular weight) ≤15.0, an amount of terminal unsaturation ≤0.20 per 1.0×10⁴ carbon atoms and a Tm ≥131.0° C.; and a second polyethylene (e.g., ≥5.0 wt % based on the weight of the membrane) having a melting point <131.0° C. The membrane has a meltdown temperature ≥180.0° C., a shutdown temperature ≤131.0° C., and a 170° C. TD heat shrinkage ≤30.0%. Optionally, the mixture further comprises polypropylene. The mixture can be, e.g., a reactor blend, a dry mixture, etc. In an embodiment, the membrane is substantially free of polyethylene having a terminal unsaturation amount >0.20 per 1.0×10⁴ carbon atoms. For example, the membrane contains ≤10.0 wt %, e.g., ≤5.0 wt %, such as ≤1.0 wt % of polyethylene having a terminal unsaturation amount >0.20 per 1.0×10⁴ carbon atoms, based on the weight of the membrane.

In an embodiment, the amount of polymethylpentene is in the range of 5.0 wt %≤polymethylpentene <25.0 wt %, the amount of polypropylene is in the range of 0.0 wt %≤polypropylene ≤25.0 wt %, the total amount of polyethylene is in the range of 50.0 wt %<polyethylene ≤95.0 wt %, the weight percents being based on the weight of the membrane. Optionally, the microporous membrane comprises polymethylpentene in the range of 10.0 wt %≤polymethylpentene ≤25.0 wt %, polypropylene in the range of 5.0 wt %≤polypropylene ≤15.0 wt %, and a total amount of polyethylene in the range of 60.0 wt %≤polyethylene ≤85.0 wt %. The polyethylene can be a mixture (e.g., a dry mixture or reactor blend) of the first and second polyethylenes. Optionally, the polyethylene mixture further comprises a third polyethylene, the third polyethylene having an Mw ≥1.0×10⁶.

In an embodiment, the first and second polyethylenes are combined with the third polyethylene to produce a polyethylene mixture, the polyethylene mixture comprising the first polyethylene in an amount in the range of 45.0 wt %≤first polyethylene ≤65.0 wt %; the second polyethylene in an amount in the range of 5.0 wt %≤second polyethylene ≤25.0 wt %; e.g., 7.0 wt %≤second polyethylene ≤23.0 wt %, such as 9.0 wt %≤second polyethylene ≤21.0 wt %; and the third polyethylene in an amount in the range of 10.0 wt %≤third polyethylene ≤50.0 wt %, the weight percents being based on the weight of the polyethylene in the mixture.

In any of the preceding embodiments, the membrane can have one or more of the following characteristics: (i) the amount of polymethylpentene (wt %) in the membrane is ≥the amount of polypropylene (wt %) in the membrane, the weight percents being based on the weight of the membrane; (ii) the polymethylpentene and polypropylene are present in the membrane in a combined amount ≥25.0 wt %, e.g., in the range of 25.0 wt % to 35.0 wt % based on the weight of the membrane; (iii) the polymethylpentene has a melting point ("Tm") in the range of 210° C. to 240° C., e.g., in the range of 223.0° C. to 230.0° C., and melt flow rate ("MFR") in the range of 10 dg/min to 40 dg/min, e.g., in the range of 22.0 dg/min to 28.0 dg/min; and (iv) the polypropylene is an isotactic polypropylene having an Mw ≥6.0×10⁵, e.g., in the range of about 0.8×10⁶ to about 3.0×10⁶, such as in the range of about 0.9×10⁶ to about 2.0×10⁶, an MWD ≤20.0, or ≤8.5, or ≤6.0, e.g., in the range of 2.0 to about 8.5, such as in the range of 2.5 to 6.0, and a heat of fusion ("ΔHm") ≥90.0 J/g, e.g., in the range of 110 J/g to 120 J/g.

In any of the preceding embodiments, the membrane can have one or more of the following properties: a 105° C. TD heat shrinkage ≤5.0%; a 130° C. TD heat shrinkage <20.0%, a normalized pin puncture strength ≥80.0 mN/μm; a thickness ≤35.0 μm, a porosity in the range of 20% to 80%; and a normalized air permeability ≤220.0 seconds/100 cm$^3$/μm.

For example, in one embodiment, the membrane is a microporous membrane which comprises: (i) 32.0 wt % to 36.0 wt % of the first polyethylene, the first polyethylene having an Mw in the range of from about $4.0\times10^5$ to about $6.0\times10^5$, and an MWD of from about 3.0 to about 10.0, an amount of terminal unsaturation ≤0.14 per $1.0\times10^4$ carbon atoms, and a Tm ≥132° C.; (ii) 14.0 to 18.0 wt % of the second polyethylene, the second polyethylene having a Tm in the range of from 115.0° C. to 130.0° C., an Mw in the range of from $5.0\times10^3$ to $4.0\times10^5$, and an MWD in the range of 1.5 to 20; (iii) 19.0 wt % to 23.0 wt %, of the polymethylpentene, the polymethylpentene having a Tm in the range of 223.0° C. to 230.0° C. and an MFR in the range of 22.0 dg/min to 28.0 dg/min; (iv) 17.0 wt % to 21.0 wt % of a third polyethylene, the third polyethylene having an Mw ≥$1.0\times10^6$ and an MWD ≤50.0; and (v) 8.0 wt % to 12.0 wt % of isotactic polypropylene having an Mw ≥$5.0\times10^5$, an MWD ≤6.0, and a ΔHm ≥90.0 J/g, the weight percents being based on the weight of the membrane. Such a microporous membrane can have e.g., one or more of (and optionally all of) the following properties: a thickness in the range of 15.0 μm to 30.0 μm; a meltdown temperature in the range of 190° C. to 210° C., e.g., 197° C. to 205° C.; a 105° C. TD heat shrinkage ≤5.0%, e.g., in the range of 0.01% to 5.0%, a 130° C. TD heat shrinkage ≤18.0%, e.g., in the range of 1.0% to 18.0%; a normalized air permeability ≤220 seconds/100 cm$^3$/μm, e.g., in the range of 10 seconds/100 cm$^3$/μm to 210 seconds/100 cm$^3$/μm; a porosity in the range 30.0% to 60.0%, and a normalized pin puncture strength ≥80.0 mN/μm, e.g., in the range of 80.0 mN/μm to $2.5\times10^2$ mN/μm.

In an embodiment, the membrane comprises micropores and microfibrils, the microfibrils comprising the polymethylpentene, the first polyethylene, and the second polyethylene. Optionally, substantially all of the polymer in the membrane is located in the microfibrils, e.g., ≥90.0 wt %, such as ≥95.0 wt %, or ≥99.0 wt %, based on the total weight of polymer in the membrane. Optionally ≤10.0 wt %, such as ≤5.0 wt %, or ≤1.0 wt % of the polymethylpentene, the first polyethylene, and/or the second polyethylene in the membrane is in a non-microfibril morphology, e.g., in the form of islands, rafts, or spheres, the weight percentage being based on the combined weight of the polymethylpentene, the first polyethylene, and the second polyethylene. Optionally, the polymer in the microfibrils comprises ≥90.0 wt %, e.g., ≥95.0 wt %, or ≥99.0 wt %, of a single polymeric phase based on the weight of the microfibrils. Optionally, the membrane contains ≤10.0 wt %, such as ≤5.0 wt %, or ≤1.0 wt % of phase-separated polymer (such as continuous, co-continuous, or discontinuous polyethylene and/or polymethylpentene phases) based on the weight of the membrane.

The embodiments of the preceding invention serve to amplify certain aspects of the invention, but the invention is not limited thereto, and this description of these embodiments is not meant to foreclose other embodiments within the broader scope of the invention. The microporous membrane comprises polymers, and these polymers will now be described in more detail.

Polymethylpentene

In an embodiment, the polymethylpentene ("PMP") comprises polymer or copolymer wherein at least 80.0% (by number) of the recurring units are units derived from methylpentene. The desired PMP has a melting temperature (Tm) ≥200.0° C., e.g., in the range of 200.0° C. to 250.0° C., such as from 210.0° C. to 240.0° C., or from about 220.0° C. to about 230.0° C. Since it is more difficult to produce a uniform mixture of PMP and PE when the difference between PE Tm and PMP Tm is relatively large, the PMP optionally has a Tm ≤250.0° C., such as ≤240.0° C., e.g., ≤230.0° C. It has also been observed that when the PMP has a Tm <200.0° C., it is more difficult to produce a membrane having a relatively high meltdown temperature. The PMP's Tm can be determined by differential scanning calorimetry methods similar to those described below for polypropylene.

In an embodiment, the PMP has a melt flow rate ("MFR" measured according to ASTM D 1238; 260° C./5.0 kg) ≤80.0 dg/min, for example from about 0.5 dg/min to 60.0 dg/min, such as from about 1 dg/min to about 30 dg/min, e.g., in the range of 10 dg/min to 40 dg/min. When the MFR of PMP is >80.0 dg/min, it can be more difficult to produce a membrane having a relatively high meltdown temperature. In one or more embodiments, the PMP has an Mw in the range of $1.0\times10^4$ to $4.0\times10^6$. The PMP's Mw and MWD can be determined by gel permeation chromatography methods similar to those described below for polypropylene, as exemplified in "*Macromolecules*, Vol. 38, pp. 7181-7183 (2005)," which are similar to those described below for measuring polypropylene and polyethylene Mw and MWD.

The PMP can be produced, e.g., in a polymerization process using a Ziegler-Natta catalyst system (such as catalyst systems containing titanium or titanium and magnesium) or a "single site catalyst". In an embodiment, the PMP is produced by coordination polymerization using methylpentene-1 monomer, such as 4-methylpentene-1, or methylpentene-1 with one or more comonomers such as α-olefin. Optionally, the α-olefin is one or more of butene-1, pentene-1,3-methylbutene-1, hexene-1,4-methylpentene-1, heptene-1, octene-1, nonene-1, and decene-1. Cyclic comonomer(s) such as cyclopentene, 4-methylcyclopentene, norbornene, tricyclo-3-decene, etc., can also be used. In an embodiment, the comonomer is hexene-1, octene-1. In other embodiments, the comonomer has a number of carbon atoms in the range of $C_{10}$ to $C_{18}$, e.g., $C_{16}$ to $C_{18}$. The comonomer content in the PMP is generally ≤20.0 mol. %.

The PMP can be a mixture of PMPs (e.g., dry mixed or a reactor blend) to produce a mixture having a Tm ≤250.0° C., e.g., ≤240.0° C.

Polyethylene

The membrane comprises the first and second polyethylene, and optionally a third polyethylene.

PE1

In an embodiment, the first polyethylene ("PE1") is, e.g., one having an Mw <$1.0\times10^6$, e.g., in the range of from about $1.0\times10^5$ to about $0.90\times10^6$, an MWD in the range of from about 2.0 to about 50.0, and a terminal unsaturation amount <0.20 per $1.0\times10^4$ carbon atoms. Optionally, PE1 has an Mw in the range of from about $4.0\times10^5$ to about $6.0\times10^5$, and an MWD of from about 3.0 to about 10.0. Optionally, PE1 has an amount of terminal unsaturation ≤0.14 per $1.0\times10^4$ carbon atoms, or ≤0.12 per $1.0\times10^4$ carbon atoms, e.g., in the range of 0.05 to 0.14 per $1.0\times10^4$ carbon atoms (e.g., below the detection limit of the measurement). PE1 can be, e.g., SUNFINE® SH-800 or SH-810 high density PE, available from Asahi Kasei Chemical Corporation.

PE2

In an embodiment, the second polyethylene ("PE2") comprises an ethylene-based polyolefin homopolymer or copolymer having Tm ≥110.0° C., e.g., in the range of from 115.0° C. to 130.0° C., and an Mw in the range of from $5.0\times10^3$ to $4.0\times10^5$. When the Tm is ≤115.0° C., it is more difficult to produce a thermally-stable membrane (one having low heat shrinkage, for example) without also reducing membrane permeability. Thermal treatment temperatures (e.g., heat setting temperatures) >110.0° C. are generally used to produce thermally-stable (low heat shrinkage) membranes, and membrane permeability decreases when the heat setting temperature is ≥ the polymer's Tm. When the first polyethylene's Tm is >131.0° C., it is more difficult to produce a microporous membrane having both high air permeability and low shutdown temperature. It has been discovered that when the first polyethylene's Mw is significantly <$5.0 \times 10^3$ or Mw is significantly >$4.0 \times 10^5$, it is more difficult to produce a microporous membrane having good air permeability even when Tm is relatively high, e.g., in the range of 125° C. to 130° C., or greater.

Tm is measured in accordance with JIS K7122. Namely, a sample of the first polyethylene resin (0.5-mm-thick molding melt-pressed at 210° C.) is placed at ambient temperature in a sample holder of a differential scanning calorimeter (Pyris Diamond DSC available from Perkin Elmer, Inc.), heat-treated at 230° C. for 1 minute in a nitrogen atmosphere, cooled to 30° C. at 10° C./minute, kept at 30° C. for 1 minute, and heated to 230° C. at a speed of 10° C./minute.

In an embodiment, the first polyethylene has a Tm in the range of from 120.0° C. to 128.0° C., such as 120.0° C. to 126.0° C., or 120.5° C. to 124.5° C., or 121.0° C. to 124.0° C. In another embodiment, the first polyethylene has Tm in the range of from 122.0° C. to 126.0° C.

In an embodiment, the first polyethylene has Mw in the range of from $8.0 \times 10^3$ to $2.0 \times 10^5$. In another embodiment, the first polyethylene has Mw in the range of from $1.0 \times 10^4$ to $1.0 \times 10^5$. Optionally, the first polyethylene has an MWD ≤50.0, for example, in the range of from 1.5 to 20.0, from about 1.5 to about 5.0, or from about 1.8 to about 3.5.

In an embodiment, the first polyethylene comprises a copolymer of ethylene and a comonomer such as α-olefin. The comonomer is generally present in a relatively small amount compared to the amount of ethylene. For example, the comonomer amount is generally less than 10% by mole based on 100% by mole of the copolymer, such as from 1.0% to 5.0% by mol. The comonomer can be, for example, one or more of propylene, butene-1, pentene-1, hexene-1,4-methylpentene-1, octene-1, vinyl acetate, methyl methacrylate, styrene, or other monomers. Such a polymer or copolymer can be produced using any suitable catalyst, including a single-site catalyst. For example, the polymer can be produced according to the methods disclosed in U.S. Pat. No. 5,084,534 (such as the methods disclosed therein in examples 27 and 41), which is incorporated by reference herein in its entirety.

PE3

In an embodiment, the third polyethylene ("PE3") is, e.g., one having an Mw ≥$1.0 \times 10^6$, e.g., in the range of from about $1.0 \times 10^6$ to about $5.0 \times 10^6$ and an MWD ≤50.0, e.g., ≤20.0, e.g., in the range of from about 1.2 to about 20.0. A non-limiting example of PE3 is one having an Mw of from about $1.0 \times 10^6$ to about $3.0 \times 10^6$, for example about $2.0 \times 10^6$, and an MWD ≤20.0, e.g., in the range of from about 2.0 to about 20.0, preferably about 4.0 to about 15.0. PE3 can be, e.g., an ethylene homopolymer or an ethylene/α-olefin copolymer containing 5.0 mol. % of one or more comonomers such as α-olefin, based on 100% by mole of the copolymer. The comonomer can be, for example, one or more of propylene, butene-1, pentene-1, hexene-1,4-methylpentene-1, octene-1, vinyl acetate, methyl methacrylate, or styrene. Such a polymer or copolymer can be produced using a Ziegler-Natta or a single-site catalyst, though this is not required. Such a PE can have a melting point ≥134° C. PE3 can be ultra-high molecular weight polyethylene ("UHMWPE"), e.g., HI-ZEX MIL-LION® 240-m polyethylene, available from Mitsui Chemicals, Inc.

The melting points of PE1-PE3 can be determined using the methods disclosed in PCT Patent Publication No. WO 2008/140835, for example.

Polypropylene

Optionally, the membrane further comprises polypropylene. In an embodiment, the polypropylene ("PP") is, e.g., one having an Mw ≥$6.0 \times 10^5$, such as ≥$7.5 \times 10^5$, for example in the range of from about $0.80 \times 10^6$ to about $2.0 \times 10^6$, such as in the range of about $0.90 \times 10^6$ to about $3.0 \times 10^6$. Optionally, the PP has a Tm ≥160.0° C. and a heat of fusion ("ΔHm") ≥90.0 J/g, e.g., ≥100.0 J/g, such as in the range of from 110 J/g to 120 J/g. Optionally, the PP has an MWD ≤20.0, or ≤6.0, e.g., in the range of from about 1.5 to about 10.0, such as in the range of from about 2.0 to about 8.5 or in the range of from 2.5 to 6.0. Optionally, the PP is a copolymer (random or block) of propylene and ≤5.0 mol. % of a comonomer, the comonomer being, e.g., one or more α-olefins such as ethylene, butene-1, pentene-1, hexene-1,4-methylpentene-1, octene-1, vinyl acetate, methyl methacrylate, and styrene, etc.; or diolefins such as butadiene, 1,5-hexadiene, 1,7-octadiene, 1,9-decadiene, etc.

In an embodiment, the PP is isotactic polypropylene. The term "isotactic polypropylene" means PP having a meso pentad fraction ≥about 50.0 mol. % mmmm pentads, optionally ≥about 94.0 mol. % mmmm pentads, or preferably ≥96.0 mol. % mmmm pentads (based on the total number of moles of isotactic PP). In an embodiment, the PP has (a) a meso pentad fraction ≥about 90.0 mol. % mmmm pentads, preferably ≥94.0 mol. % mmmm pentads; and (b) has an amount of stereo defects ≤about 50.0 per $1.0 \times 10^4$ carbon atoms, e.g., ≤about 20 per $1.0 \times 10^4$ carbon atoms, or ≤about 10.0 per $1.0 \times 10^4$ carbon atoms, such as ≤about 5.0 per $1.0 \times 10^4$ carbon atoms. Optionally, the PP has one or more of the following properties: (i) a Tm ≥162.0° C.; (ii) an elongational viscosity ≥about $5.0 \times 10^4$ Pa sec at a temperature of 230° C. and a strain rate of 25 sec$^{-1}$; (iii) a Trouton's ratio ≥about 15 when measured at a temperature of about 230° C. and a strain rate of 25 sec$^{-1}$; (iv) a Melt Flow Rate ("MFR"; ASTM D-1238-95 Condition L at 230° C. and 2.16 kg) ≤about 0.1 dg/min, optionally ≤about 0.01 dg/min (i.e., a value is low enough that the MFR is essentially not measurable); or (v) an amount extractable species (extractable by contacting the PP with boiling xylene) ≤0.5 wt %, e.g., ≤0.2 wt %, such as ≤0.1 wt % or less based on the weight of the PP.

In an embodiment, the PP is an isotactic PP having an Mw in the range of from about $0.8 \times 10^6$ to about $3.0 \times 10^6$, optionally $0.9 \times 10^6$ to about $2.0 \times 10^6$ and MWD ≤8.5, e.g., in the range of from about 2.0 to about 8.5, optionally 2.0 to 6.0, and a ΔHm ≥90.0 J/g. Generally, such a PP has a meso pentad fraction ≥94.0 mol. % mmmm pentads, an amount of stereo defects ≤about 5.0 per $1.0 \times 10^4$ carbon atoms, and a Tm ≥162.0° C.

A non-limiting example of the PP, and methods for determining the PP's Tm, meso pentad fraction, tacticity, intrinsic viscosity, Trouton's ratio, stereo defects, and amount of extractable species are described in PCT Patent Publication No. WO2008/140835, which is incorporated by reference herein in its entirety.

The PP's ΔHm, is determined by the methods disclosed in PCT Patent Publication No. WO2007/132942, which is incorporated by reference herein in its entirety. Tm can be determined from differential scanning calorimetric (DSC) data obtained using a Perkin Elmer Instrument, model Pyris 1 DSC. Samples weighing approximately 5.5-6.5 mg are sealed in aluminum sample pans. Starting at a temperature 30° C., Tm is measured by heating the sample to 230° C. at a rate of 10° C./minute, called first melt (no data recorded). The sample is kept at 230° C. for 10 minutes before a cooling-heating cycle is applied. The sample is then cooled from 230° C. to 25° C. at a rate of 10° C./minute, called "crystallization", then kept at 25° C. for 10 minutes, and then heated to 230° C. at a rate of 10° C./minute, called "second melt". For PMP Tm, a temperature of 270° C. is used instead of 230° C. The thermal events in both crystallization and second melt are recorded. The melting temperature ($T_m$) is the peak temperature of the second melting curve and the crystallization temperature ($T_c$) is the peak temperature of the crystallization peak.

Other Species

Optionally, inorganic species (such as species containing silicon and/or aluminum atoms), and/or heat-resistant polymers such as those described in PCT Publications No. WO 2007/132942 and WO 2008/016174 (both of which are incorporated by reference herein in their entirety) can be present in the first and/or second layer.

When the microporous membrane is produced by extrusion, the final microporous membrane generally comprises the polymer used to produce the extrudate. A small amount of diluent or other species introduced during processing can also be present, generally in amounts less than 1 wt % based on the weight of the membrane. A small amount of polymer molecular weight degradation might occur during processing, but this is acceptable. In a form, molecular weight degradation during processing, if any, causes the value of MWD of the polymer in the membrane to differ from the MWD of the polymer used to produce the membrane (e.g., before extrusion) by no more than, e.g., about 10%, or no more than about 1%, or no more than about 0.1%.

Mw and MWD Determination

Polymer Mw and MWD can be determined using a High Temperature Size Exclusion Chromatograph, or "SEC", (GPC PL 220, Polymer Laboratories), equipped with a differential refractive index detector (DRI). The measurement is made in accordance with the procedure disclosed in "*Macromolecules*, Vol. 34, No. 19, pp. 6812-6820 (2001)". Three PLgel Mixed-B columns (available from Polymer Laboratories) are used for the Mw and MWD determination. For PE, the nominal flow rate is 0.5 cm³/min; the nominal injection volume is 300 µL; and the transfer lines, columns, and the DRI detector are contained in an oven maintained at 145° C. For PP and PMP, the nominal flow rate is 1.0 cm³/min; the nominal injection volume is 300 µL; and the transfer lines, columns, and the DRI detector are contained in an oven maintained at 160° C.

The GPC solvent used is filtered Aldrich reagent grade 1,2,4-Trichlorobenzene (TCB) containing approximately 1000 ppm of butylated hydroxy toluene (BHT). The TCB is degassed with an online degasser prior to introduction into the SEC. The same solvent is used as the SEC eluent. Polymer solutions are prepared by placing dry polymer in a glass container, adding the desired amount of the TCB solvent, and then heating the mixture at 160° C. with continuous agitation for about 2 hours. The concentration of polymer solution is 0.25 to 0.75 mg/ml. Sample solutions are filtered off-line before injecting to GPC with 2 µm filter using a model SP260 Sample Prep Station (available from Polymer Laboratories).

The separation efficiency of the column set is calibrated with a calibration curve generated using seventeen individual polystyrene standards ranging in Mp ("Mp" being defined as the peak in Mw) from about 580 to about 10,000,000. The polystyrene standards are obtained from Polymer Laboratories (Amherst, Mass.). A calibration curve (log Mp vs. retention volume) is generated by recording the retention volume at the peak in the DRI signal for each PS standard and fitting this data set to a 2nd-order polynomial. Samples are analyzed using IGOR Pro, available from Wave Metrics, Inc.

Membrane Production Method

In one or more embodiments, the microporous membranes can be produced by combining the polymer mixture (e.g., PMP, PE1, PE2, and optionally the PP and/or PE3) with diluent and optional constituents, such as inorganic fillers, to form a polymer-diluent mixture and then extruding the polymer-diluent mixture to form an extrudate. At least a portion of the diluent is removed from the extrudate to form the microporous membrane. For example, a blend of PMP, PE1, and PE2 can be combined with diluent such as liquid paraffin to form a mixture, with the mixture being extruded to form a monolayer membrane. Additional layers can be applied to the extrudate, if desired, e.g., to provide the finished membrane with a low shutdown functionality. In other words, monolayer extrudates or monolayer microporous membranes can be laminated or coextruded to form multilayered membranes.

The process for producing the membrane can further comprise optional steps for, e.g., removing at least a portion of any remaining volatile species from the membrane at any time after diluent removal, subjecting the membrane to a thermal treatment (such as heat setting or annealing) before or after diluent removal, stretching the extrudate in at least one planar direction before diluent removal, and/or stretching the membrane in at least one planar direction after diluent removal. An optional hot solvent treatment step, an optional heat setting step, an optional cross-linking step with ionizing radiation, and an optional hydrophilic treatment step, etc., as described in PCT Publication No. WO 2008/016174 can be conducted if desired. Neither the number nor order of the optional steps is critical.

Producing the Polymer-Diluent Mixture

In one or more embodiments, PMP, PE1, PE2, and optionally PP and/or PE3 (as described above) are combined to form a polymer mixture and this mixture is combined with diluent (which can be a mixture of diluents, e.g., a solvent mixture) to produce a polymer-diluent mixture. Mixing can be conducted in, e.g., in an extruder such as a reaction extruder. Such extruders include, without limitation, twin-screw extruders, ring extruders, and planetary extruders. Practice of the invention is not limited to the type of reaction extruder employed. Optional species can be included in the polymer-diluent mixture, e.g., fillers, antioxidants, stabilizers, and/or heat-resistant polymers. The type and amounts of such optional species can be the same as described in PCT Publications No. WO 2007/132942, WO 2008/016174, and WO 2008/140835, all of which are incorporated by reference herein in their entirety.

The diluent is generally compatible with the polymers used to produce the extrudate. For example, the diluent can be any species or combination of species capable of forming a single phase in conjunction with the resin at the extrusion temperature. Examples of the diluent include one or more of aliphatic or cyclic hydrocarbon such as nonane, decane, decalin and paraffin oil, and phthalic acid ester such as dibutyl phthalate and dioctyl phthalate. Paraffin oil with a kinetic viscosity of 20-200 cSt at 40° C. can be used, for example. The diluent can be the same as those described in U.S. Patent Application Publication Nos. 2008/0057388 and 2008/0057389, both of which are incorporated by reference in their entirety.

In an embodiment, the blended polymer in the polymer-diluent mixture comprises an amount $A_1$ of PMP, an amount $A_2$ of PE1, an amount $A_3$ of PE2, an amount $A_4$ of PE3, and an amount $A_5$ of PP, wherein 5.0 wt %≤$A_1$≤25.0 wt %; 30.0 wt %≤$A_2$≤50.0 wt %; 5.0 wt %≤$A_3$≤20.0 wt %; 0.0 wt %≤$A_4$≤40.0 wt %; and 0.0 wt %≤$A_5$≤25.0 wt %, with the weight percents being based on the weight of the polymer in the polymer-diluent mixture. Optionally, $A_1$ is in the range of 10.0 wt %≤$A_1$≤25.0 wt %, $A_2$ is in the range of 30.0 wt %≤$A_2$≤40.0 wt %, and $A_3$ is in the range of 10.0 wt %≤$A_3$≤20.0 wt %. Optionally, $A_4$ is in the range of 15.0 wt % to 25.0 wt % and $A_5$ is in the range of 5.0 wt %≤$A_5$<15.0 wt %. Optionally, $A_1$≥$A_5$ and/or $A_1$+$A_5$≥25.0 wt %. The PMP, PE1, PE2, PE3, and PP are as described above.

In an embodiment, the polymer and diluent are combined using a mixing energy <0.50 KWh/kg, e.g., in the range of 0.20 KWh/kg >mixing energy ≥0.39 KWh/kg. It has been discovered that when the mixing energy is in this range, it is possible to stretch the extrudate to a greater magnification without tearing, which leads to both (a) higher membrane yield from the process, and (b) higher strength in the finished membrane. Mixing energy has the units Kilowatt hour/kilogram. While not wishing to be bound by any theory or model, it is believed that utilizing a mixing energy ≤0.50 KWh/kg provides improved dispersion of the PMP in the mixture, thereby providing the membrane with greater puncture strength. For example, in one embodiment, the membrane comprises substantially homogenous polymer (e.g., substantially no phase separation of polymer species), e.g., the membrane is substantially free of polymeric domains of PE, PP, or PMP having a diameter ≥10 nm. Optionally, ≤0.01 wt %, such as ≤0.001 wt %, of the polymer in the membrane resides in domains having a diameter ≥10 nm, based on the total weight of polymer in the membrane.

It is also believed that utilizing a 0.20 KWh/kg >mixing energy ≥0.39 KWh/kg lessens the amount of polymer degradation and maintains advantageous operating characteristics such as useful permeability. At higher mixing energy, polymer molecular weight degradation is believed to occur (e.g., by shear thinning during mixing), and poor permeability is observed.

In one or more embodiments, the polyolefins are mixed within an extruder operating at ≤400 rpm, in other embodiments ≤350 rpm, in other embodiments ≤300 rpm, in other embodiments ≤275 rpm, in other embodiments ≤250 rpm, and in other embodiments ≤225 rpm. In an embodiment, the polymer-diluent mixture during extrusion is exposed to a temperature in the range of 140° C. to 250° C., e.g., 210° C. to 240° C. In an embodiment, the amount of diluent used to produce the extrudate is in the range, e.g., of from about 20.0 wt % to about 99.0 wt % based on the weight of the polymer-diluent mixture, with the balance being polymer. For example, the amount of diluent can be in the range of about 60.0 wt % to about 80.0 wt %.

Producing the Extrudate

In a form, the polymer-diluent mixture is conducted from an extruder through a die to produce the extrudate. The extrudate should have an appropriate thickness to produce, after the stretching steps, a final membrane having the desired thickness (generally ≥1.0 μm). For example, the extrudate can have a thickness in the range of about 0.1 mm to about 10.0 mm, or about 0.5 mm to 5 mm. Extrusion is generally conducted with the polymer-diluent mixture in the molten state. When a sheet-forming die is used, the die lip is generally heated to an elevated temperature, e.g., in the range of 140° C. to 250° C. Suitable process conditions for accomplishing the extrusion are disclosed in PCT Publications No. WO 2007/132942 and WO 2008/016174.

If desired, the extrudate can be exposed to a temperature in the range of about 15° C. to about 25° C. to form a cooled extrudate. Cooling rate is not particularly critical. For example, the extrudate can be cooled at a cooling rate of at least about 30° C./minute until the temperature of the extrudate (the cooled temperature) is approximately equal to the extrudate's gelation temperature (or lower). Process conditions for cooling can be the same as those disclosed in PCT Publications No. WO 2007/132942, WO 2008/016174, and WO 2008/140835, for example.

Stretching the Extrudate (Upstream Stretching)

The extrudate or cooled extrudate can be stretched in at least one direction (called "upstream stretching" or "wet stretching"), e.g., in a planar direction such as MD or TD. It is believed that such stretching results in at least some orientation of the polymer in the extrudate. This orientation is referred to as "upstream" orientation. The extrudate can be stretched by, for example, a tenter method, a roll method, an inflation method or a combination thereof, as described in PCT Publication No. WO 2008/016174, for example. The stretching may be conducted monoaxially or biaxially, though the biaxial stretching is preferable. In the case of biaxial stretching, any of simultaneous biaxial stretching, sequential stretching or multi-stage stretching (for instance, a combination of the simultaneous biaxial stretching and the sequential stretching) can be used, though simultaneous biaxial stretching is preferable. When biaxial stretching is used, the amount of magnification need not be the same in each stretching direction.

The stretching magnification can be, for example, 2 fold or more, preferably 3 to 30 fold in the case of monoaxial stretching. In the case of biaxial stretching, the stretching magnification can be, for example, 3 fold or more in any direction, namely 9 fold or more, such as 16 fold or more, e.g., 25 fold or more, in area magnification. An example for this stretching step would include stretching from about 9 fold to about 49 fold in area magnification. Again, the amount of stretch in either direction need not be the same. The magnification factor operates multiplicatively on film size. For example, a film having an initial width (TD) of 2.0 cm that is stretched in TD to a magnification factor of 4 fold will have a final width of 8.0 cm.

The stretching can be conducted while exposing the extrudate to a temperature (the upstream orientation temperature) in the range of from about the Tcd temperature to Tm, where Tcd and Tm are defined as the crystal dispersion temperature and melting point of the PE having the lowest melting point among the polyethylenes used to produce the extrudate (generally the PE such as PE1 or PE3). The crystal dispersion temperature is determined by measuring the temperature characteristics of dynamic viscoelasticity according to ASTM D 4065. In an embodiment where Tcd is in the range of about 90° C. to about 100° C., the stretching temperature can be from about 90° C. to 125° C.; e.g., from about 100° C. to 125° C., such as from 105° C. to 125° C.

When the sample (e.g., the extrudate, dried extrudate, membrane, etc.) is exposed to an elevated temperature, this exposure can be accomplished by heating air and then conveying the heated air into proximity with the sample. The temperature of the heated air, which is generally controlled at a set point equal to the desired temperature, is then conducted toward the sample through a plenum for example. Other methods for exposing the sample to an elevated temperature, including conventional methods such as exposing the sample to a heated surface, infrared heating in an oven, etc., can be used with or instead of heated air.

Diluent Removal

In a form, at least a portion of the diluent is removed (or displaced) from the stretched extrudate to form a dried membrane. A displacing (or "washing") solvent can be used to remove (wash away or displace) the diluent, as described in PCT Publication No. WO 2008/016174, for example.

In an embodiment, at least a portion of any remaining volatile species (e.g., washing solvent) is removed from the dried membrane after diluent removal. Any method capable of removing the washing solvent can be used, including conventional methods such as heat-drying, wind-drying (moving air), etc. Process conditions for removing volatile species, such as washing solvent, can be the same as those disclosed in PCT Publication No. WO 2008/016174, for example.

Stretching the Membrane (Downstream Stretching)

The dried membrane can be stretched (called "downstream stretching" or "dry stretching" since at least a portion of the diluent has been removed or displaced) in at least one direction, e.g., MD and/or TD. It is believed that such stretching results in at least some orientation of the polymer in the membrane. This orientation is referred to as downstream orientation. Before downstream stretching, the dried membrane has an initial size in MD (a first dry length) and an initial size in TD (a first dry width). As used herein, the term "first dry width" refers to the size of the dried membrane in TD prior to the start of dry orientation. The term "first dry length" refers to the size of the dried membrane in MD prior to the start of dry orientation. Tenter stretching equipment of the kind described in WO 2008/016174 can be used, for example.

The dried membrane can be stretched in MD from the first dry length to a second dry length that is larger than the first dry length by a magnification factor (the "MD dry stretching magnification factor") in the range of from about 1.1 to about 1.6, e.g., in the range of 1.1 to 1.5. When TD dry stretching is used, the dried membrane can be stretched in TD from the first dry width to a second dry width that is larger than the first dry width by a magnification factor (the "TD dry stretching magnification factor"). Optionally, the TD dry stretching magnification factor is ≤the MD dry stretching magnification factor. The TD dry stretching magnification factor can be in the range of from about 1.1 to about 1.6. The dry stretching (also called re-stretching since the diluent-containing extrudate has already been stretched) can be sequential or simultaneous in MD and TD. Since TD heat shrinkage generally has a greater effect on battery properties than does MD heat shrinkage, the amount of TD magnification generally does not exceed the amount of MD magnification. When biaxial dry stretching is used, the dry stretching can be simultaneous in MD and TD or sequential. When the dry stretching is sequential, generally MD stretching is conducted first, followed by TD stretching.

The dry stretching can be conducted while exposing the dried membrane to a temperature (the downstream orientation temperature) ≤Tm, e.g., in the range of from about Tcd–30° C. to Tm. In a form, the stretching temperature is conducted with the membrane exposed to a temperature in the range of from about 70° C. to about 135° C., for example from about 120° C. to about 132° C., such as from about 128° C. to about 132° C.

In a form, the MD stretching magnification is in the range of from about 1.0 to about 1.5, such as 1.2 to 1.4; the TD dry stretching magnification is ≤1.6, e.g. in the range of from about 1.1 to about 1.55, such as 1.15 to 1.5, or 1.2 to 1.4; the MD dry stretching is conducted before the TD dry stretching, and the dry stretching is conducted while the membrane is exposed to a temperature in the range of about 80° C. to about 132° C., e.g., in the range of about 122° C. to about 130° C.

The stretching rate is preferably 3%/second or more in the stretching direction (MD or TD), and the rate can be independently selected for MD and TD stretching. The stretching rate is preferably 5%/second or more, more preferably 10%/second or more, e.g., in the range of 5%/second to 25%/second.

Though not particularly critical, the upper limit of the stretching rate is preferably 50%/second to prevent rupture of the membrane.

Controlled Reduction of the Membrane's Width

Following the dry stretching, the dried membrane can be subjected to a controlled reduction in width from the second dry width to a third dry width, the third dry width being in the range of from the first dry width to about 1.1 times larger than the first dry width. The width reduction generally conducted while the membrane is exposed to a temperature ≥Tcd–30° C., but no greater than Tm. For example, during width reduction the membrane can be exposed to a temperature in the range of from about 70° C. to about 135° C., such as from about 122° C. to about 132° C., e.g., from about 125° C. to about 130° C. The temperature can be the same as the downstream orientation temperature. In a form, the decreasing of the membrane's width is conducted while the membrane is exposed to a temperature that is lower than Tm. In a form, the third dry width is in the range of from 1.0 times larger than the first dry width to about 1.4 times larger than the first dry width.

It is believed that exposing the membrane to a temperature during the controlled width reduction that is ≥the temperature to which the membrane was exposed during the TD stretching leads to greater resistance to heat shrinkage in the finished membrane.

Heat Set

Optionally, the membrane is thermally treated (heat-set) at least once following diluent removal, e.g., after dry stretching, the controlled width reduction, or both. It is believed that heat-setting stabilizes crystals and makes uniform lamellas in the membrane. In a form, the heat setting is conducted while exposing the membrane to a temperature in the range Tcd to Tm, e.g., a temperature in the range of from about 100° C. to about 135° C., such as from about 120° C. to about 132° C., or from about 122° C. to about 130° C. The heat set temperature can be the same as the downstream orientation temperature. Generally, the heat setting is conducted for a time sufficient to form uniform lamellas in the membrane, e.g., a time ≤1000 seconds, e.g., in the range of 1 to 600 seconds. In a form, the heat setting is operated under conventional heat-set "thermal fixation" conditions. The term "thermal fixation" refers to heat-setting carried out while maintaining the length and width of the membrane substantially constant, e.g., by holding the membrane's perimeter with tenter clips during the heat setting.

Optionally, an annealing treatment can be conducted after the heat-set step. The annealing is a heat treatment with no load applied to the membrane, and can be conducted by using, e.g., a heating chamber with a belt conveyer or an air-floating-type heating chamber. The annealing may also be conducted continuously after the heat-setting with the tenter slackened. During annealing, the membrane can be exposed to a temperature in the range of Tm or lower, e.g., in the range from about 60° C. to about Tm–5° C. Annealing is believed to provide the microporous membrane with improved permeability and strength.

Optional heated roller, hot solvent, crosslinking, hydrophilizing, and coating treatments can be conducted, if desired, e.g., as described in PCT Publication No. WO 2008/016174.

Structure and Properties of Membrane

The membrane is microporous membrane that is permeable to liquid (aqueous and non-aqueous) at atmospheric pressure. Thus, the membrane can be used as a battery separator, filtration membrane, etc. The thermoplastic film is particularly useful as a BSF for a secondary battery, such as a nickel-hydrogen battery, nickel-cadmium battery, nickel-zinc battery, silver-zinc battery, lithium-ion battery, lithium-ion polymer battery, etc. In an embodiment, the invention relates to lithium-ion secondary batteries containing BSF comprising the thermoplastic film. Such batteries are described in PCT Publication No. WO 2008/016174, which is incorporated herein by reference in its entirety. Optionally, the membrane can have one or more of the following properties.

Thickness

In an embodiment, the thickness of the final membrane is ≥1.0 μm, e.g., in the range of about 1.0 μm to about $1.0 \times 10^2$ μm. For example, a monolayer membrane can have a thickness in the range of about 1.0 μm to about 30.0 μm, and a multilayer membrane can have a thickness in the range of 7.0 μm to 30.0 μm, but these values are merely representative. The membrane's thickness can be measured, e.g., by a contact thickness meter at 1 cm longitudinal intervals over the width of 10 cm, and then averaged to yield the membrane thickness. Thickness meters such as a Model RC-1 Rotary Caliper, available from Maysun, Inc., 746-3 Gokanjima, Fuji City, Shizuoka, Japan 416-0946 or a "Litematic" available from Mitsutoyo Corporation, are suitable. Non-contact thickness measurement methods are also suitable, e.g., optical thickness measurement methods. In an embodiment, the membrane has a thickness ≤30.0 μm.

Porosity ≥20.0%

The membrane's porosity is measured conventionally by comparing the membrane's actual weight to the weight of an equivalent non-porous membrane of 100% polymer (equivalent in the sense of having the same polymer composition, length, width, and thickness). Porosity is then determined using the formula: Porosity $\% = 100 \times (w2-w1)/w2$, where "w1" is the actual weight of the membrane, and "w2" is the weight of an equivalent non-porous membrane (of the same polymers) having the same size and thickness. In a form, the membrane's porosity is in the range of 20.0% to 80.0%.

Normalized Air Permeability ≤$2.8 \times 10^2$ Seconds/100 cm$^3$/μm

In an embodiment, the membrane has a normalized air permeability ≤$2.8 \times 10^2$ seconds/100 cm$^3$/μm (as measured according to JIS P8117), such as ≤$2.6 \times 10^2$ seconds/100 cm$^3$/μm, e.g., ≤$1.0 \times 10^2$ seconds/100 cm$^3$/μm. Optionally, the membrane has a normalized air permeability in the range of 10.0 seconds/100 cm$^3$/μm to $2.7 \times 10^2$ seconds/100 cm$^3$/μm. Since the air permeability value is normalized to the value for an equivalent membrane having a film thickness of 1.0 μm, the membrane's air permeability value is expressed in units of "seconds/100 cm$^3$/μm". Normalized air permeability is measured according to JIS P8117, and the results are normalized to the permeability value of an equivalent membrane having a thickness of 1.0 μm using the equation $A = 1.0 \mu m \ast (X)/T_1$, where X is the measured air permeability of a membrane having an actual thickness $T_1$ and A is the normalized air permeability of an equivalent membrane having a thickness of 1.0 μm.

Normalized Pin Puncture Strength ≥80.0 mN/1.0 μm

The membrane's pin puncture strength is expressed as the pin puncture strength of an equivalent membrane having a thickness of 1.0 μm and a porosity of 50% [mN/μm]. Pin puncture strength is defined as the maximum load measured at ambient temperature when the membrane having a thickness of $T_1$ is pricked with a needle of 1 mm in diameter with a spherical end surface (radius R of curvature: 0.5 mm) at a speed of 2 mm/second. The pin puncture strength ("S") is normalized to the pin puncture strength value of an equivalent membrane having a thickness of 1.0 μm and a porosity of 50% using the equation $S_2 = [50\% \ast 20 \mu m \ast (S_1)]/[T_1 \ast (100\%-P)]$, where $S_1$ is the measured pin puncture strength, $S_2$ is the normalized pin puncture strength, P is the membrane's measured porosity, and $T_1$ is the average thickness of the membrane. Optionally, the membrane's normalized pin puncture strength is ≥$1.0 \times 10^2$ mN/1.0 μm, e.g., ≥$2.0 \times 10^2$ mN/1.0 μm, such as in the range of $1.0 \times 10^2$ mN/1.0 μm to $4.0 \times 10^2$ mN/1.00 μm.

Shutdown Temperature ≤131.0° C.

The microporous membrane's shutdown temperature is measured by the method disclosed in PCT Publication No. WO 2007/052663, which is incorporated by reference herein in its entirety. According to this method, the microporous membrane is exposed to an increasing temperature (5° C./minute beginning at 30° C.) while measuring the membrane's air permeability. The microporous membrane's shutdown temperature is defined as the temperature at which the microporous membrane's air permeability (Gurley Value) first exceeds $1.0 \times 10^5$ seconds/100 cm$^3$. For the purpose of measuring membrane meltdown temperature and shutdown temperature, air permeability can be measured according to JIS P8117 using, e.g., an air permeability meter (EGO-1T available from Asahi Seiko Co., Ltd.). In an embodiment, the shutdown temperature is ≤131.0° C. or ≤129.0° C., e.g., in the range of 120.0° C. to 129.0° C.

Meltdown Temperature (as Measured by Membrane Rupture) ≥180.0° C.

In an embodiment, the microporous membrane has a meltdown temperature ≥180.0° C., such as ≥190.0° C., e.g., ≥200.0° C. Optionally, the membrane has a meltdown temperature in the range of about 190.0° C. to about 210.0° C., such as in the range of 197.0° C. to 210.0° C. Meltdown temperature can be measured as follows. A sample of the microporous membrane measuring 5 cm×5 cm is fastened along its perimeter by sandwiching the sample between metallic blocks each having a circular opening of 12 mm in diameter. The blocks are then positioned so the plane of the membrane is horizontal. A tungsten carbide ball of 10 mm in diameter is placed on the microporous membrane in the circular opening of the upper block. Starting at 30° C., the membrane is then exposed to an increasing temperature at rate of 5° C./minute. The temperature at which the microporous membrane is ruptured by the ball is defined as the membrane's meltdown temperature.

105° C. TD Heat Shrinkage ≤5.0%

In an embodiment, the membrane has a TD heat shrinkage at 105.0° C. ≤5.0%, such as ≤2.0%, e.g., in the range of from about 0.01% to about 0.5%. Optionally, the membrane has an MD heat shrinkage at 105.0° C. ≤5.0%, e.g., in the range of about 0.5% to about 5.0%.

The membrane's heat shrinkage in orthogonal planar directions (e.g., MD or TD) at 105.0° C. (the "105° C. heat shrinkage") is measured as follows: (i) measure the size of a test piece of microporous membrane at 23.0° C. in both MD and TD; (ii) expose the test piece to a temperature of 105.0° C. for 8 hours with no applied load; and then (iii) measure the size of the membrane in both MD and TD. The heat (or "thermal") shrinkage in either the MD or TD can be obtained by dividing the result of measurement (i) by the result of measurement and (ii) expressing the resulting quotient as a percent.

130° C. TD Heat Shrinkage and 170° C. TD Heat Shrinkage

In an embodiment, the membrane has a 130° C. TD heat shrinkage ≤20.0%, such as ≤10.0%, for example in the range of from about 1.0% to about 20.0%. In an embodiment, the membrane has a 170° C. TD heat shrinkage ≤30.0%, such as ≤28.0%, e.g., from about 15.0% to about 30.0%.

The measurement of 130° C. and 170° C. heat shrinkage is slightly different from the measurement of heat shrinkage at 105° C., reflecting the fact that the edges of the membrane parallel to the transverse direction are generally fixed within the battery, with a limited degree of freedom allowed for expansion or contraction (shrinkage) in TD, particularly near the center of the edges parallel to MD. Accordingly, a square sample of microporous film measuring 50 mm along TD and 50 mm along MD is mounted in a frame and exposed to a temperature of 23.0° C., with the edges parallel to TD fixed to the frame (e.g., by tape) leaving a clear aperture of 35 mm in MD and 50 mm in TD. The frame with sample attached is then exposed to a temperature of 130.0° C. or 170.0° C. for thirty minutes, and then cooled. TD heat shrinkage generally causes the edges of the film parallel to MD to bow slightly inward (toward the center of the frame's aperture). The shrinkage in TD (expressed as a percent) is equal to the length of the sample in TD before heating divided by the narrowest length (within the frame) of the sample in TD after heating times 100 percent.

This invention will be described in more detail with reference to Examples below without intention of restricting the scope of this invention.

EXAMPLES

Example 1

(1) Preparation of the Polymer-Diluent Mixture

A polymer-diluent mixture is prepared as follows by combining liquid paraffin diluent and a polymer blend of PMP, PP, PE1, PE2, and PE3. The polymer blend comprises (a) 21.0 wt % of polymethylpentene (Mitsui Chemicals, Inc. TPX: MX002) having an MFR of 21 dg/min and a Tm of 222° C. (PMP); (b) 10.0 wt % of isotactic PP having an Mw of $1.1\times10^6$ and a $\Delta$Hm of 114 J/g (PP1); (c) 34.0 wt % of polyethylene having an Mw of $5.6\times10^5$, an MWD of 4.05, an amount of terminal unsaturation 0.14 per $1.0\times10^4$ carbon atoms, and a Tm of 136.0° C. (PE1); (d) 16.0 wt % of a polyethylene having an Mw of $2.5\times10^5$ and a Tm of 123.0° C. (PE2); and (e) 19.0.0 wt % of a polyethylene having a Mw of $1.9\times10^6$ and a Tm of 136.0° C. (PE3), the weight percents being based on the weight of the combined polymer.

Next, 25.0 wt % of the polymer blend is charged into a strong-blending double-screw extruder having an inner diameter of 58 mm and L/D of 42, and 75.0 wt % of the liquid paraffin (50 cst at 40° C.) is supplied to the double-screw extruder via a side feeder. Mixing is conducted at 220° C. and 200 rpm to produce the polymer-diluent mixture, the weight percents being based on the weight of the polymer-diluent mixture.

(2) Production of Membrane

The polymer-diluent mixture is conducted from the extruder to a sheet-forming die, to form an extrudate (in the form of a sheet). The die temperature is 210° C. The extrudate is cooled by contact with cooling rollers controlled at 20° C. The cooled extrudate is simultaneously biaxially stretched (upstream stretching) at 115° C. to a magnification of 5 fold in both MD and TD by a tenter-stretching machine. The stretched gel-like sheet is fixed to an aluminum frame of 20 cm×20 cm, immersed in a bath of methylene chloride controlled at 25° C. to remove the liquid paraffin with vibration of 100 rpm for 3 minutes, and dried by air flow at room temperature. While holding the size of the membrane substantially constant, the membrane is then heat-set at 115.0° C. for 10 minutes to produce the final microporous membrane. Selected starting materials, process conditions, and membrane properties are set out in Table 1.

Example 2 and Comparative Examples 1 and 2

Example 1 is repeated except as noted in Table 1. Starting materials and process conditions are the same as are used in Example 1, except as noted in the Table. For example, PE1 and PE2 are replaced by a polyethylene PE4 (Lupolen™, available from Basell) having an Mw=$7.46\times10^5$, an MWD=11.85, and an amount of terminal unsaturation >0.20 per $1.0\times10^4$ carbon atoms.

TABLE 1

|  |  | Ex. 1 | Ex. 2 | C. E. 1 | C. E. 2 |
|---|---|---|---|---|---|
| PMP | Content (wt %) | 21.0 | 20.0 | 20.0 | 20.0 |
| PP | Grade | PP1 | PP2 | PP1 | PP1 |
|  | Content (wt %) | 10.0 | 10.0 | 10.0 | 10.0 |
| PE | Grades | PE1 | PE1 | PE4 | PE4 |
|  | Content (wt %) | 34.0 | 40.0 | 40.0 | 52.0 |
|  |  | PE2 | PE2 |  |  |
|  |  | 16.0 | 8.0 |  |  |
|  |  | PE3 | PE3 | PE3 | PE3 |
|  |  | 19.0 | 30.0 | 30.0 | 18.0 |
| Processing Condition |  |  |  |  |  |
| Polymer content (wt %) polymer-diluent mixture | | 25 | 25 | 25 | 25 |
| Extrusion |  |  |  |  |  |
| Extrusion Temperature (° C.) | | 220 | 220 | 220 | 220 |
| Stretching |  |  |  |  |  |
| Temperature (° C.) | | 115 | 115 | 115 | 115 |
| Magnification (MD × TD) | | 5 × 5 | 5 × 5 | 5 × 5 | 5 × 5 |
| Heat Set |  |  |  |  |  |
| Temperature (° C.) | | 115 | 115 | 125 | 125 |
| Properties |  |  |  |  |  |
| Average Thickness (µm) | | 20 | 22 | 22 | 19 |
| Porosity (%) | | 32 | 37 | 37 | 35 |
| Normalized Air Permeability (sec/100 cm³/µm) | | 267 | 71.6 | 68.2 | 68.5 |
| Puncture Strength (mN/µm) | | 127.5 | 111.0 | 177.5 | 150.5 |
| 105° C. TD Heat Shrinkage (%) | | 4.0 | 5.0 | 3.0 | 2.3 |
| 130° C. TD Heat Shrinkage (%) | | 17 | 16 | 16 | 14 |
| 170° C. TD Heat Shrinkage (%) | | 25 | 26 | 38 | 32 |
| Meltdown Temperature (° C.) | | 205 | 201 | 201 | 199 |
| Shutdown Temperature (° C.) | | 124 | 128 | >131 | >131 |

Examples 1 and 2 show that a microporous membrane having a meltdown temperature ≥180.0° C., a shutdown temperature ≤131.0° C., and a 170° C. TD heat shrinkage ≤30.0%. can be produced from PMP, PE1, and PE2. The membranes of these examples have properties suitable for use as BSF in lithium ion batteries. The relatively low 170° C. TD heat shrinkage value is particularly desirable given the membrane's relatively high meltdown temperature because it provides an improved BSF safety margin at temperatures above the membrane's shutdown temperature. Comparative Examples 1 and 2 show that the alternative methods for achieving lower shutdown performance (by using polyethylene having a relatively high terminal vinyl content) are much less effective at providing low heat shrinkage values at high temperature. Even using a relatively high Tm PE4 (compared to the Tm of PE2) and a relatively higher heat setting temperature, the membranes of Comparative Examples 1 and 2 have significantly larger high temperature heat shrinkage values. It is expected that using an even lower Tm PE4 and lower heat setting temperature might result in a membrane of having a slightly lower shutdown temperature than those of Comparative Examples 1 and 2, but also having even worse high temperature heat shrinkage performance.

All patents, test procedures, and other documents cited herein, including priority documents, are fully incorporated by reference to the extent such disclosure is not inconsistent and for all jurisdictions in which such incorporation is permitted.

While the illustrative forms disclosed herein have been described with particularity, it will be understood that various other modifications will be apparent to and can be readily made by those skilled in the art without departing from the spirit and scope of the disclosure. Accordingly, it is not intended that the scope of the claims appended hereto be limited to the examples and descriptions set forth herein but rather that the claims be construed as encompassing all the features of patentable novelty which reside herein, including all features which would be treated as equivalents thereof by those skilled in the art to which this disclosure pertains.

When numerical lower limits and numerical upper limits are listed herein, ranges from any lower limit to any upper limit are contemplated.

The invention claimed is:

1. A membrane comprising a polymer mixture comprising: (a) polymethylpentene having a $Tm \geq 200.0°C$., and an $MFR \leq 80.0$ dg/min; (b) a first polyethylene having an $Mw < 1.0 \times 10^6$, an $MWD \leq 15.0$, an amount of terminal unsaturation $\leq 0.20$ per $1.0 \times 10^4$ carbon atoms and a $Tm \geq 131.0°C$.; and (c) a second polyethylene having a $Tm < 131.0°C$., wherein the membrane contains $\leq 1.0$ wt. % of polyethylene having a terminal unsaturation amount $>0.20$ per $1.0 \times 10^4$ carbon atoms and (i) is microporous; (ii) has a meltdown temperature $\geq 180.0°C$.; (iii) has a shutdown temperature $\leq 131.0°C$.; and (iv) has a 170° C. TD heat shrinkage $\leq 30.0\%$.

2. The membrane of claim 1, which is free of polyethylene having a terminal unsaturation amount $>0.20$ per $1.0 \times 10^4$ carbon atoms.

3. The microporous membrane of claim 1, wherein the polymethylpentene is contained in an amount of 5.0 wt % to 15.0 wt %, based on the weight of the membrane.

4. The microporous membrane of claim 1, further comprising polypropylene in an amount of 5.0 wt % to 20.0 wt %, based on the weight of the membrane.

5. The microporous membrane of claim 1, wherein the membrane has a 105° C. TD heat shrinkage $\leq 5.0\%$, a 130° C. TD heat shrinkage $\leq 20.0\%$, a normalized pin puncture strength $\geq 80.0$ mN/μm, a thickness $\leq 30.0$ μm, a porosity of 20% to 80%, and a normalized air permeability $\leq 280.0$ seconds/100 cm$^3$/μm.

6. The microporous membrane of claim 1, wherein the membrane comprises micropores and microfibrils, the microfibrils comprising a substantially single phase of the polymethylpentene, the first polyethylene, and the second polyethylene.

7. The microporous membrane of claim 4, wherein (i) the polypropylene is an isotactic polypropylene having an $Mw \geq 6.0 \times 10^5$, an $MWD \leq 6.0$, and a $\Delta Hm \geq 90.0$ J/g; and (ii) the polymethylpentene has an MFR of 22.0 dg/min to 28.0 dg/min and a Tm of 223.0° C. to 230.0°C.

8. The microporous membrane of claim 1, wherein (i) the first polyethylene has an amount of terminal unsaturation $\leq 0.14$ per $1.0 \times 10^4$ carbon atoms; and
(ii) the second polyethylene has a Tm of 115.0° C. to 130.0° C., an Mw of $5.0 \times 10^3$ to $4.0 \times 10^5$, and an MWD of 1.5 to about 5.

9. The microporous membrane of claim 6, wherein the microfibrils comprise $>90.0$ wt % of a single polymer phase of the polymethylpentene, the first polyethylene, and the second polyethylene, based on the weight of the microfibrils, and wherein the membrane contains $\geq 1.0$ wt % of phase-separated polymer, based on the weight of the membrane.

10. A battery separator film comprising the microporous membrane of claim 1.

* * * * *

UNITED STATES PATENT AND TRADEMARK OFFICE
CERTIFICATE OF CORRECTION

| | | |
|---|---|---|
| PATENT NO. | : 8,841,032 B2 | Page 1 of 1 |
| APPLICATION NO. | : 13/322925 | |
| DATED | : September 23, 2014 | |
| INVENTOR(S) | : Ishihara et al. | |

It is certified that error appears in the above-identified patent and that said Letters Patent is hereby corrected as shown below:

In the Specification

In Column 17

At line 33 after "unsaturated" please change "0.14 per" to -- $\leq 0.14$ per --.

In Column 10

At line 30, please change "$\geq 1.0$" to -- $\leq 1.0$ --.

Signed and Sealed this
Seventeenth Day of February, 2015

Michelle K. Lee
*Deputy Director of the United States Patent and Trademark Office*